United States Patent [19]

Sassenhausen

[11] 4,179,538

[45] Dec. 18, 1979

[54] PROCESS OF ELIMINATING CRACKING IN THE COATING OF $TIO_2$ LAYERS

[75] Inventor: Herbert R. Sassenhausen, Webster, N.Y.

[73] Assignee: Eastman Kodak Company, Rochester, N.Y.

[21] Appl. No.: 831,206

[22] Filed: Sep. 6, 1977

[30] Foreign Application Priority Data

Sep. 10, 1976 [GB] United Kingdom ............... 37421/76

[51] Int. Cl.[2] ......................... B05D 1/34; B05D 1/36; B32B 27/30; B32B 27/18; B32B 23/04; B32B 9/02

[52] U.S. Cl. .................................... 430/213; 430/935; 427/407 G; 427/407 D; 427/414; 427/415; 428/481; 428/508; 430/531; 428/475

[58] Field of Search ................... 427/414, 415, 407 G; 428/475, 508, 481

[56] References Cited

U.S. PATENT DOCUMENTS

| | | | |
|---|---|---|---|
| 2,761,791 | 9/1956 | Russell | 427/414 |
| 3,362,819 | 1/1968 | Land | 96/3 |
| 3,362,822 | 1/1968 | Haas et al. | 96/29 |
| 3,421,892 | 1/1969 | Taylor | 96/3 |
| 3,445,228 | 5/1969 | Beavers et al. | 96/3 |
| 3,594,165 | 7/1971 | Rogers | 96/3 |
| 3,615,421 | 10/1971 | Land | 96/3 |
| 3,672,890 | 6/1972 | Land | 96/3 |
| 3,679,409 | 7/1972 | Buckler et al. | 96/3 |
| 3,756,815 | 9/1973 | Schlein et al. | 96/3 |
| 3,833,369 | 9/1974 | Chiklis et al. | 96/3 |

FOREIGN PATENT DOCUMENTS

| | | | |
|---|---|---|---|
| 1269805 | 4/1972 | United Kingdom | 96/3 |

*Primary Examiner*—James R. Hoffman
*Attorney, Agent, or Firm*—H. E. Cole

[57] ABSTRACT

A process for eliminating cracking in a titanium dioxide-hydroxyethylcellulose layer by simultaneously coating thereover a hydrophilic colloid layer such as gelatin.

11 Claims, No Drawings

PROCESS OF ELIMINATING CRACKING IN THE COATING OF $TiO_2$ LAYERS

This invention relates to the coating of a pigmented layer for photographic products, and in particular to a method of coating a layer comprising a titanium dioxide pigment in a hydroxyethylcellulose binder to eliminate cracking in said titanium dioxide layer which might otherwise occur, and the products obtained thereby.

U.S. Pat. No. 3,594,165 describes an integral photographic element in which the image is formed by a dye developer process and which contains a processing solution-permeable titanium dioxide layer adjacent to an image-receiving layer. The titanium dioxide layer, behind the image-receiving layer with respect to the viewing side, masks the silver halide and other layers below and provides a white background for viewing the image. The specific example in this patent describes the preparation of a photographic film unit wherein the titanium dioxide layer (layer 4) comprises a layer of titanium dioxide dispersed in hydroxyethylcellulose and coated at a coverage of about 1200 milligrams per square foot of titanium dioxide and about 30 milligrams per square foot of hydroxyethylcellulose. On top of this layer is coated a gelatin layer at a coverage of about 200 milligrams per square foot. When the example was attempted to be carried out, however, I found that the titanium dioxide layer, when coated over the image-receiving layer, cracked severely and separated from the underlying layers on drying in a pattern which is known in the art as "mud-flat cracking".

In U.S. Pat. No. 2,761,791, there is described a multiple coating hopper which is used in photography to coat layers simultaneously. Although there are many advantages for coating multiple layers in photographic elements simultaneously, there is no indication in this patent that a severe physical problem such as "mud-flat cracking", can be eliminated by employing this technique.

I have found that "mud-flat cracking" of a titanium dioxide layer comprising a titanium dioxide pigment dispersed in a hydroxyethylcellulose binder in a specific concentration can be elminated by employing the invention described herein.

In accordance with my invention, I have provided a process of coating a layer comprising a titanium dioxide pigment and a hydroxyethylcellulose binder on a water-absorbent layer carried by a support wherein the ratio of titanium dioxide to hydroxyethylcellulose is such that the titanium dioxide layer has a propensity to crack during the coating, wherein during the coating of said titanium dioxide layer, a hydrophilic colloid layer is simultaneously coated thereover, thereby eliminating the propensity of said titanium dioxide layer to crack.

While the invention is described hereinafter with relation to the coating of a titanium dioxide layer over an image-receiving layer, such as a mixture of polyvinyl alcohol and poly-4-vinyl pyridine, it is believed that the propensity of the titanium dioxide layer to crack can be eliminated when it is coated over any water-absorbent layer.

While the invention is useful for eliminating cracking in any titanium dioxide-hydroxyethylcellulose layer which has a propensity to do so, it has been found that the greatest propensity for such a layer to crack is prevalent when the ratio of titanium dioxide to hydroxyethylcellulose is from 10:1 to 80:1 by weight, such as 40:1.

Any hydrophilic colloid layer can be used in the invention for simultaneous multilayer coating (SMC) to eliminate the cracking of the titanium dioxide layer underneath. There may be used, for example, gelatin, polyvinyl alcohol, alkali metal salts of alkyl acrylate-acrylic acid copolymers as described in Houck et al, U.S. Pat. No. 3,062,674, etc. Especially good results have been obtained with gelatin.

The following examples will not illustrate the invention.

EXAMPLE 1

A three-layer substructure was obtained by coating the following layers in sequence on a polyester film support:

(a) a polymeric acid layer of the partial butyl ester of poly(ethylene/maleic anhydride) at a coverage of 11 $g/m^2$;

(b) a polymeric spacer layer of hydroxypropylcellulose (Klucel-G, Hercules Powder Company) at a coverage of 1.9 $g/m^2$; and (c) a polymeric image-receiving layer of a 2:1 mixture of polyvinyl alcohol and poly-4-vinyl-pyridine at a coverage of 6.4 $g/m^2$.

(A) A titanium dioxide dispersion was prepared and coated over the above-described three-layer substructure at the following coverage:

(a) $TiO_2$ (anatase form of $TiO_2$, Unitane 0-520, American Cyanamide Company) 12.9 $g/m^2$ (b) Hydroxyethylcellulose (Natrosol 250 L, Hercules Powder Company) 0.11 $g/m^2$ (c) Daxad-30 dispersing agent (the sodium salt of poly(methacrylic acid), Dewey and Almy, Division of W. R. Grace Company) 0.129 $g/m^2$ The $TiO_2$ dispersion was coated at 65 $g/m^2$ at a rate of 6.1 m/min and dried at a dew point of 6° C. for 72 seconds at 21° C. and 78 seconds at 32° C. This photographic element A) exhibited severe "mud-flat cracking" and was essentially useless.

(B) Part (A) was repeated except that a gelatin solution was coated at 27 $g/m^2$ (to give a gelatin coverage of 2.1 $g/m^2$) simultaneously (SMC) from a multiple coating hopper as described in U.S. Pat. No. 2,761,791 (FIG. 9). This photographic element B did not exhibit "mud-flat cracking". This gelatin solution contained a small amount of saponin and Triton TX-200 as spreading agents to facilitate coating.

EXAMPLE 2

A different titanium dioxide dispersion was prepared and coated over the three-layer substructure of Example 1 at the following coverage:

(a) $TiO_2$ (TiOxide RXL, TiOxide Ltd., Canada) 12.9 $g/m^2$ (b) Hydroxyethylcellulose (Natrosol 250 L, Hercules Powder Company) 0.11 $g/m^2$ (c) Calgon dispersing agent (sodium hexametaphosphate) 0.129 $g/m^2$ This dispersion was coated and dried as in Example 1 and again exhibited severe "mud-flat cracking".

When a gelatin layer was coated SMC as in Example 1 using the above dispersion, a photographic element was obtained which did not exhibit any "mud-flat cracking".

The invention has been described in detail with particular reference to preferred embodiments thereof, but it will be understood that variations and modifications can be effected within the spirit and scope of the invention.

What is claimed is:

1. In a process of coating a layer comprising a titanium dioxide pigment and a hydroxyethylcellulose binder on a water-absorbent layer carried by a support wherein the ratio of titanium dioxide to hydroxyethylcellulose is such that said titanium dioxide layer has a propensity to crack during said coating, the improvement wherein during said coating of said titanium dioxide layer, a hydrophilic colloid layer is simultaneously coated thereover, thereby eliminating the propensity of said titanium dioxide layer to crack.

2. The process of claim 1 wherein the ratio of titanium dioxide to hydroxyethylcellulose is 10:1 to 80:1 by weight.

3. The process of claim 2 wherein the ratio of titanium dioxide to hydroxyethylcellulose is 40:1 by weight.

4. The product of the process of claim 2.

5. The process of claim 1 wherein said water-absorbent layer is a 2:1 mixture of polyvinyl alcohol and poly-4-vinyl pyridine.

6. The product of the process of claim 5.

7. The process of claim 1 wherein said hydrophilic colloid layer is gelatin.

8. The product of the process of claim 7.

9. The product of the process of claim 1.

10. In a process of coating a support with the following layers in sequence:

(a) a polymeric acid layer comprising the partial butyl ester of polyethylene/maleic anhydride copolymer;

(b) a polymeric spacer layer comprising hydroxypropylcellulose;

(c) a polymeric image-receiving layer comprising a 2:1 mixture of polyvinyl alcohol and poly-4-vinyl pyridine; and (d) a layer of titanium dioxide and hydroxyethylcellulose in a ratio of 40:1, by weight, said titanium dioxide layer having a propensity to crack during said coating, the improvement wherein during said coating of said titanium dioxide layer, a gelatin layer is simultaneously coated thereover, thereby eliminating the propensity of said titanium dioxide layer to crack.

11. The product of the process of claim 10.

* * * * *